United States Patent [19]

Yamamoto

[11] 3,976,168
[45] Aug. 24, 1976

[54] MECHANICAL DISC BRAKE HAVING AN AUTOMATIC SLACK ADJUSTOR

[75] Inventor: Mayjue A. Yamamoto, San Bernardino, Calif.

[73] Assignee: Daniel G. Durfee, San Bernardino, Calif.

[22] Filed: Sept. 2, 1975

[21] Appl. No.: 609,223

[52] U.S. Cl............................ 188/71.9; 188/72.8; 188/196 F
[51] Int. Cl.².......................................... F16D 65/56
[58] Field of Search................ 188/71.9, 72.7, 72.8, 188/72.9, 196 D, 196 F, 196 P

[56] References Cited
UNITED STATES PATENTS

| 2,949,173 | 8/1960 | Peras | 188/196 D |
|---|---|---|---|
| 3,186,521 | 6/1965 | Chouings | 188/196 P |
| 3,331,472 | 7/1967 | Swift | 188/196 D |
| 3,378,109 | 4/1968 | Bauman | 188/72.8 |
| 3,590,964 | 7/1971 | Krause | 188/71.9 |
| 3,592,299 | 7/1971 | Erdmann | 188/196 F |
| 3,767,016 | 10/1973 | Hurt | 188/196 D |
| 3,768,602 | 10/1973 | Burnett | 188/71.9 |
| 3,812,935 | 5/1974 | Pringle | 188/196 P |
| 3,851,737 | 12/1974 | Hewins | 188/71.9 |

Primary Examiner—Stephen G. Kunin
Assistant Examiner—Edward R. Kazenske
Attorney, Agent, or Firm—Herbert E. Kidder

[57] ABSTRACT

A mechanical disc brake comprising a caliper housing having a cylinder bore, with a piston slidably disposed therein which bears at one end against one of the friction pads. Mounted in the outer end of the cylinder bore is an end plate having a screw-threaded bore to receive a power screw. One end of the power screw extends outwardly beyond the end plate and has a lever fixed thereto, which is operated by an air cylinder or other power device. A radially extending head on the inner end of the power screw abuts against a thrust bearing on the end of an adjuster screw that is screw-threaded into the skirt of the piston. A spiral spring is attached at one end to the power screw and at the other end to the adjuster screw, and exerts torque on the adjuster screw tending to rotate the latter in the direction to advance the adjuster screw toward the power screw head whenever there is any axial clearance between the adjuster screw and the power screw. The piston is returned a predetermined small amount (0.010 to 0.040 inch) when the brake is released, by a spring-pressed friction ring surrounding the piston, through which the latter slides in small increments as the brake pads wear.

7 Claims, 6 Drawing Figures

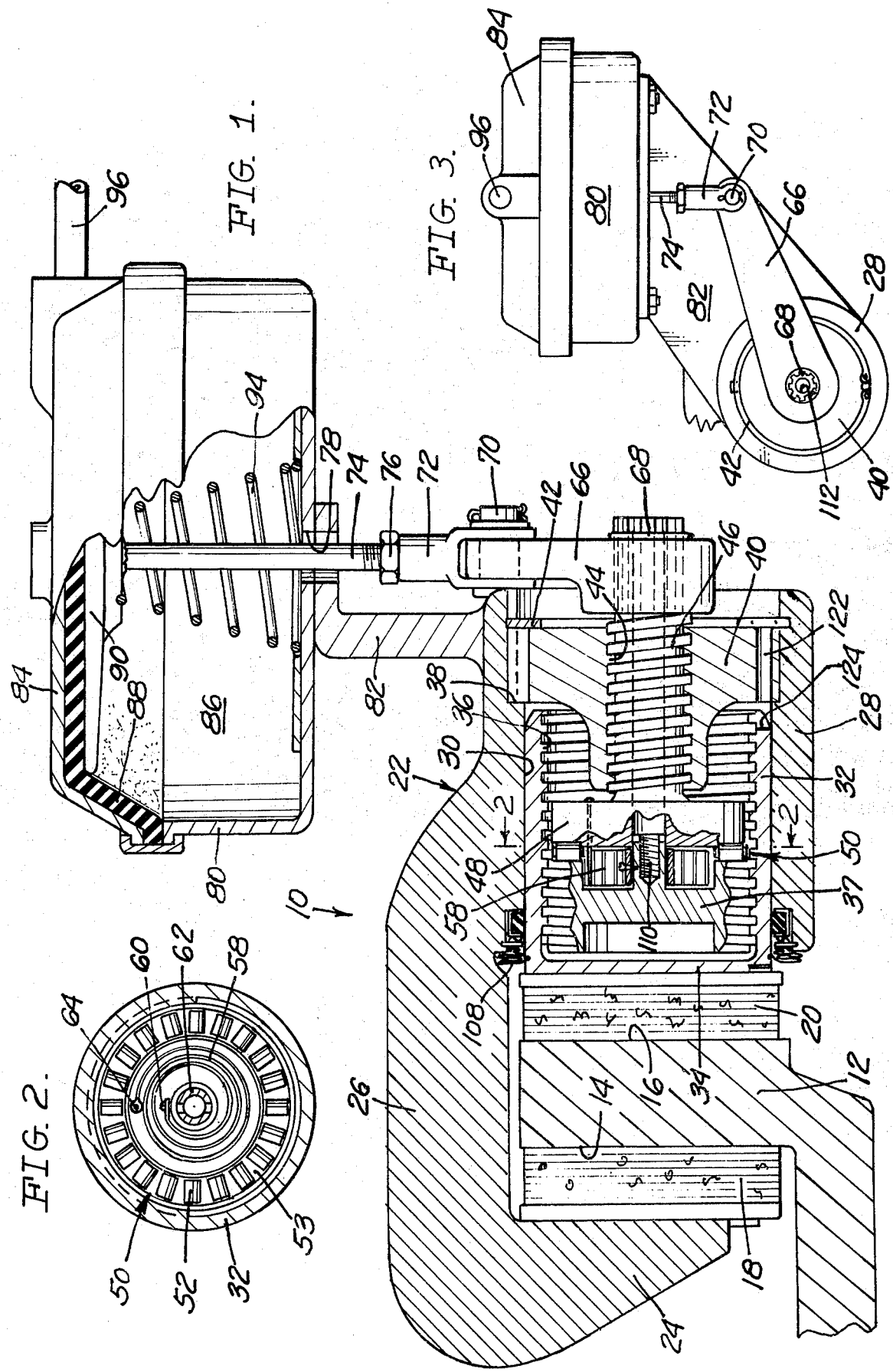

MECHANICAL DISC BRAKE HAVING AN AUTOMATIC SLACK ADJUSTOR

BACKGROUND OF THE INVENTION

The present invention pertains to disc brakes, and more particularly to mechanical disc brakes primarily for use on trucks, buses, trailers, and other heavy duty vehicles.

Heretofore, trucks, buses and trailers have generally used mechanical drum brakes operated by air cylinders, but disc brakes have well-known advantageous features that make them admirably suited to such heavy duty vehicles. However, disc brakes are usually hydraulically operated, with fluid pressure acting against a piston to press the brake pads against opposite sides of the brake disc. One essential requirement for any mechanical disc brake used in this type of service is that means be provided to take up excess clearance as the brake pads wear, and this should preferably be done automatically, while the vehicle is in operation. At the present time, there is no satisfactory self-adjusting mechanical disc brake known to me that can be operated by an air cylinder, solenoid, cam, gears, or the like.

SUMMARY OF THE INVENTION

The primary object of the present invention is to provide a new and improved mechanical disc brake that can be operated by air cylinder, solenoid, cam, gears, or the like.

Another object of the invention is to provide a mechanical disc brake having means for automatically taking up excess clearance as the brake pads wear, so that the actuating member (a lever in this case) always moves through the same distance to operate the brakes, regardless of the amount of wear on the brake pads.

A further object of the invention is to provide a mechanical disc brake of the class described that is extremely rugged, and which requires a minimum of servicing.

These and other objects and advantages of the invention will become apparent to those skilled in the art from the following detailed description of the preferred embodiment thereof, with reference to the accompanying drawings.

BRIEF DESCRIPTION OF THE DRAWINGS

FIG. 1 is a cross-sectional view of a mechanical disc brake embodying the principles of the present invention;

FIG. 2 is a transverse sectional view through the same, taken at 2—2 in FIG. 1;

FIG. 3 is an end view of the brake unit, showing how the air cylinder acts on a lever arm to operate the brakes;

DESCRIPTION OF THE PREFERRED EMBODIMENT

Figure 4:
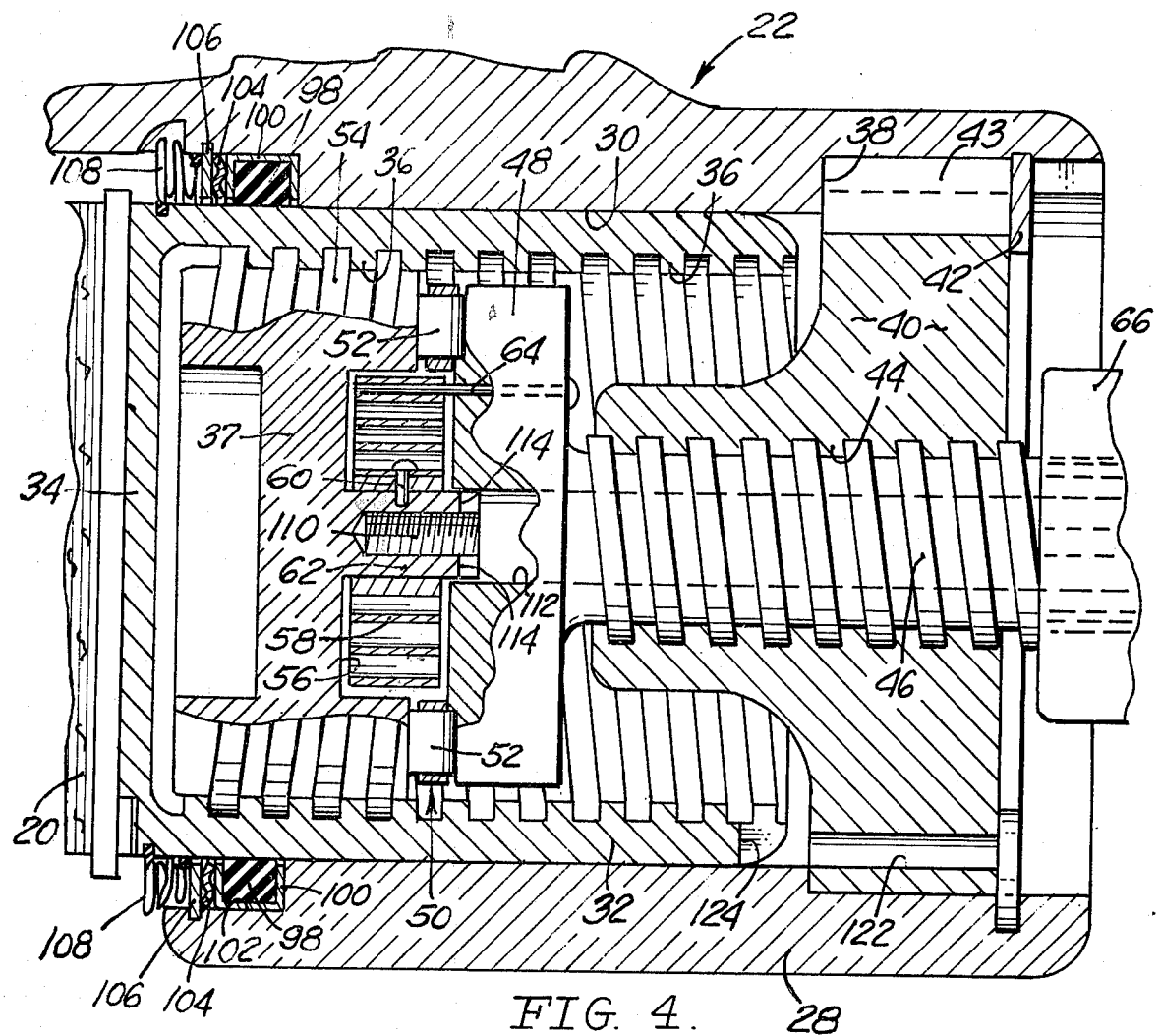
FIG. 4 is an enlarged fragmentary sectional view of the central portion of the brake body.

In the drawing, a mechanical disc brake embodying the invention is designated in its entirety by the reference numeral 10, and includes a rotatable disc 12 having a pair of friction surfaces 14 and 16 on opposite sides thereof. A pair of friction pads 18 and 20 are arranged on opposite sides of the disc, adjacent the friction faces 14 and 16, respectively, and these are adapted to frictionally engage the friction faces when the brake is actuated. A caliper frame 22 is slidably mounted on a supporting structure in a manner well-known to those skilled in the art, and includes an inwardly extending portion 24, upon which the friction pad 18 is mounted. The caliper frame also includes a bridge portion 26 which straddles the periphery of the disc 12, and a housing 28 having a cylindrical bore 30 formed therein. Cylindrical bore 30 is disposed directly behind friction pad 20, as shown in the drawings.

Slidably disposed within cylinder bore 30 is a piston 32 having an end portion 34 bearing against the adjacent friction pad 20. The skirt of the piston 32 is formed on its inner surface with a power-transmission screw thread 36, which is preferably a left-hand thread, and screwed in to these threads is an adjuster screw 37, the purpose of which will be described presently.

The outer end of the cylinder bore 30 is counterbored for a short distance, forming an annular shoulder 38 at the bottom of the counterbore, and inserted into the counterbore is an end plate 40, which is retained against the shoulder 38 by a snap ring 42, and prevented from turning by a key 43. The end plate 40 has a central bore which is provided with a power-transmission thread 44, and screwed into this thread is a power screw 46 having a radially projecting, circular head 48 on the inner end thereof. Head 48 bears against an anti-friction thrust bearing 50, which is interposed between the head 48 and the adjuster screw 37. Thrust bearing 50 is preferably a heavy-duty roller bearing to withstand the extremely high axial loads applied against it, with bearing rolls 52 contained within a cage 53 as shown in FIG. 2.

Adjuster screw 37 is a generally cylindrical member having external power-transmission threads 54 on its peripheral surface which engage the threads 36 on the inner surface of the piston skirt, and formed in the center of the adjuster screw is a cavity 56 containing a spiral spring 58. The inner end of spring 58 is attached by a machine screw 60 to a hub 62 projecting from the center of the cavity 56, while the outer end of the spring is attached by a pin 64 to the head 48 of the power screw 46. Spiral spring 58 is thus anchored to the power screw 48 and exerts a predetermined torque on the adjuster screw 37 in the direction tending to advance the adjuster screw toward the right, as seen in FIG. 1. The torque of spiral spring 58 is sufficient to turn the adjuster screw 37 whenever there is any axial clearance between the adjuster screw and the head 48 greater than the diameter of the bearing rolls 52. However, when all axial clearance has been taken up, and the adjuster screw 37 is bearing solidly against the head 48 of the power screw through the intermediary of the thrust bearing 50, there is no freedom of endwise movement toward the right for the adjuster screw, and turning of the adjuster screw by spiral spring 58 is therefore stopped. In this way, any axial clearance between the power screw 46 and the piston 32 due to wear of the friction pads 18, 20, is taken up automatically as it occurs.

The outer end of the power screw 46 (i.e., the right-hand end as seen in FIG. 1) projects beyond the outer surface of end plate 40, and is splined to receive a lever 66, said lever being secured to the splined end of the power screw by a snap ring seated in a circumferential groove. At its outer end, the lever arm 66 is connected by a pivot pin 70 to a yoke 72, which is screwed onto the bottom end of a pushrod 74 and is secured thereon by a lock nut 76.

Pushrod 74 extends up through a hole 78 in the bottom of an air chamber housing 80, which is connected by a mounting bracket 82 to the brake housing 28.

A lid 84 is mounted on the top of housing 80 and cooperates with the latter to form an enclosed chamber 86. An elastic diaphragm 88 has its edges clamped between the outer edges of housing 80 and lid 84, and bearing upwardly against the underside of the diaphragm is a circular plate 90 to which the top end of pushrod 74 is welded or otherwise fixedly secured on the bottom side of the plate at the center thereof. Seated against the bottom of housing 80 and pressing upwardly against plate 90 is a return spring 94, which urges the diaphragm 88 upwardly to the position shown in FIG. 1. An air line 96 is connected to the lid 84 and admits air under pressure to the enclosure above the diaphragm 88 when the brakes are applied, and air pressure acting against the diaphragm pushes the rod 74 downwardly, causing the outer end of lever arm 66 to be swung downwardly in the clockwise direction, as viewed in FIG. 3.

Clockwise rotation of lever arm 66 and power screw 46 causes the power screw to advance toward the left, as seen in FIG. 1, thrusting head 48 against adjuster screw 37, and causing piston 32 to be pushed to the left against friction pad 20. The reaction force on the caliper housing 22 causes the opposite friction pad 18 to be pulled against its corresponding friction surface 14.

When the brake is released, and lever arm 66 is raised to its original position by the return spring 94, power screw 46 and its head 48 are retracted to the right, and piston 32 is caused to follow the power screw by piston return means consisting of a friction ring 98 and channel-shaped retainer 100 which are seated freely within an annular groove 102 on the cylinder wall. The friction ring 98 and its retainer 100 are urged to the right by a return spring 104, and the latter is retained in groove 102 by a snap ring 106. The distance between snap ring 106 and the wall of groove 102 is sufficient to accommodate the retainer 100 and friction ring 98, together with return spring 104, when the latter is extended. When the piston 32 is pushed to the left by power screw 46, friction ring 98 grips the piston and is carried along with the latter, compressing the return spring 104 against the snap ring 106 while the brakes are applied. When the brakes are released, return spring 104 expands, pushing the retainer 100 and friction ring 98 back toward the right, thereby retracting piston 32 a certain minimum distance (usually 0.010 to 0.040 inch ) which provides normal running clearance between the brake pads and their friction surfaces. During normal operation of the brakes, when there is no excess clearance between the brake pads and their respective friction surfaces, the piston 32 only moves about 0.010 to 0.040 inch between fully-released and fully-applied positions. Thus, the return spring 104 provides sufficient return movement of the piston 32 to cause the latter to follow the power screw as the latter is retracted.

If there should be excessive clearance between the brake pads and their friction surfaces, the power screw is forced to advance the piston 32 a distance to the left in excess of the normal return travel of spring 104, and this causes the piston to slide through the friction ring 98. When the brake is then released, power screw 46 and its head 48 return to their original positions, but piston 32 is returned only the amount that the return spring 104 is capable of accomplishing. This causes a gap to open up between the adjuster screw 37 and the head 48 of the power screw 46, which allows the adjuster screw 37 to turn freely in its threads under the urging of the spiral spring 58. Spring 58 causes the adjuster screw 37 to advance toward the right until it again contacts the power screw head 48 through the intermediary of the roller thrust bearing 50; and once contact has been made, further turning of the adjuster screw 37 is stopped. Thus, any slightest amount of excess clearance that develops between the brake pads and friction surfaces is taken up immediately by the adjuster screw 37 under the urging of spiral spring 58 at the instant any excess clearance appears.

Figure 5:
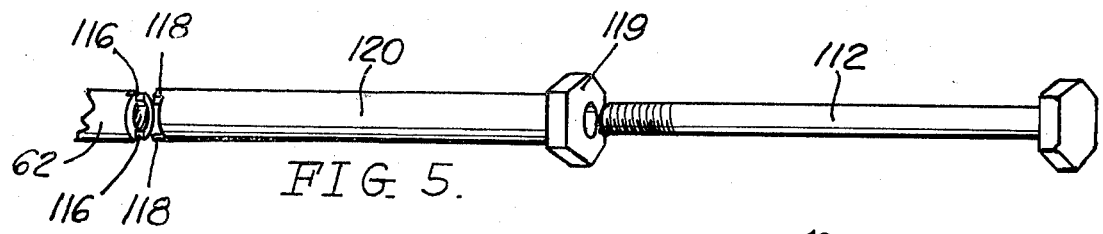
FIG. 5 is an exploded perspective view, showing two tools that are used to turn the adjuster screw so that the piston can be retracted for replacement of worn friction pads.
Figure 6:
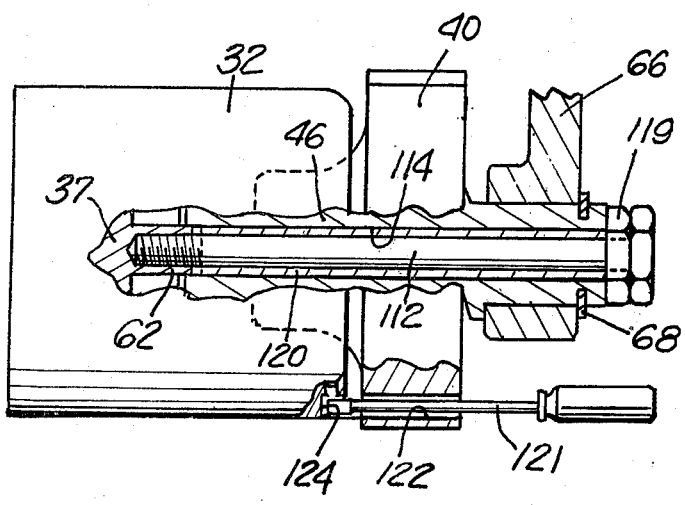
FIG. 6 is a fragmentary sectional view, showing the two tools of FIG. 5 assembled to the adjuster screw, and a third tool being used to prevent rotation of the piston.

To facilitate retracting piston 32 when the brake pads have become worn and must be replaced, means is provided for manually turning the adjuster screw 37 so as to back the piston 32 away from the pad 20. This is accomplished by means of an internally threaded bore 110 in the end of the hub 62, which is adapted to receive a threaded bolt 112 (FIGS. 5 and 6) inserted through a bore 114 extending through power screw 46 from end to end along the axis thereof. Hub 62 also has two diametrically opposed notches 116 formed in the end thereof to receive axially projecting ears 118 on the end of a tubular sleeve-like tool 120 (FIGS. 5 and 6) that telescopes over the threaded bolt and is clamped by the head of the bolt against the end of the hub 62 with ears 118 seated in notches 116, so that when they are screwed together as in FIG. 6, the tools become rigidly and nonrotatably attached to the adjuster screw 37, enabling the latter to be turned by a wrench in the direction to pull the piston 32 to the right, away from brake pad 20. The tubular, sleeve-like tool 120 has a hexagonal head 119 at its outer end to receive a wrench (not shown) that is used to hold the adjuster screw 37 against turning while the bolt 112 is being screwed into the bore 110.

Piston 32 is retracted by turning the adjuster screw 37, using a wrench on the head of bolt 112. At the same time, piston 32 is held against rotation by means of a tool 121 (such as a screwdriver) which is inserted through a hole 122 in end plate 40 and engaged in a notch 124 in the end of the piston skirt. When the piston 32 has been fully retracted to the limit of its travel toward the right, there is sufficient clearance between the friction pads 18, 20 and the disc 12 to allow the brake pads to be serviced.

While I have shown and described in considerable detail what I believe to be the preferred form of my invention, it will be understood by those skilled in the art that the invention is not limited by such details, but may take various other forms within the scope of the following claims.

What I claim is:

1. A mechanical disc brake for a heavy-duty automotive vehicle comprising, in combination:

a rotatable disc having friction faces on opposite sides thereof;

a pair of friction pads disposed with one pad adjacent each of said friction faces;

a caliper housing operably connected to each of said friction pads for urging the same into braking engagement with their respective friction faces when the brake is actuated, said caliper housing having a cylinder bore aligned with one of said friction pads;

a piston slidably disposed within said cylinder bore and having an end portion abutting against said one friction pad;

an end plate mounted in an outer end of said cylinder bore, said end plate having a threaded axial bore provided therein;

a power screw extending through said axial bore in said end plate, in threaded engagement therewith; said power screw extending externally of said end plate and having a lever fixed to the outer end thereof;

power means attached to the free end of said lever to operate the same an adjuster screw having threaded connection with said piston;

said power screw being operable to contact and exert axial thrust against said adjuster screw when the power screw is advanced by its screw-thread connection to said end plate responsive to angular movement of said lever;

spring means connected to said power screw and to said adjuster screw, and exerting a predetermined torque on the adjuster screw tending to advance the latter toward the power screw whenever there is no axial clearance between them;

means frictionally engaging said piston for retracting the same a predetermined small distance from its respective friction pad when the brake is released, so as to open up a minimum running clearance between the friction pads and said friction faces on the disc.

2. A mechanical disc brake as in claim 1, wherein said adjuster screw has external threads that engage internal threads formed on the inside surface of a shirt of said piston.

3. A mechanical disc brake as in claim 1, wherein said power screw has a radially projecting head on the inner end thereof, said head abutting against the adjacent end of said adjusting screw.

4. A mechanical disc brake as in claim 3, which further includes an anti-friction thrust bearing interposed between adjacent faces of said adjuster screw and said head.

5. A mechanical disc brake as in claim 3, wherein said power screw has an axial bore extending through the same from end to end, and said adjuster screw has an internally threaded hole at the center thereof, in line with said axial bore, to receive a threaded servicing tool, by means of which the adjuster screw can be manually turned to retract said piston.

6. A mechanical disc brake as in claim 5, wherein said end plate has an aperture extending through the same in the axial direction, said aperture being aligned with a skirt of said piston, and said piston skirt having a notch in alignment with said aperture to receive the end of a second tool inserted through the aperture, so as to hold the piston against turning while said adjuster screw is being turned.

7. A mechanical disc brake as in claim 1, wherein said power means comprises an air chamber with a diaphragm, and push rod connected to the free end of said lever; and said caliper housing having a bracket extending therefrom on which said air chamber is mounted.

* * * * *